Figure 1:
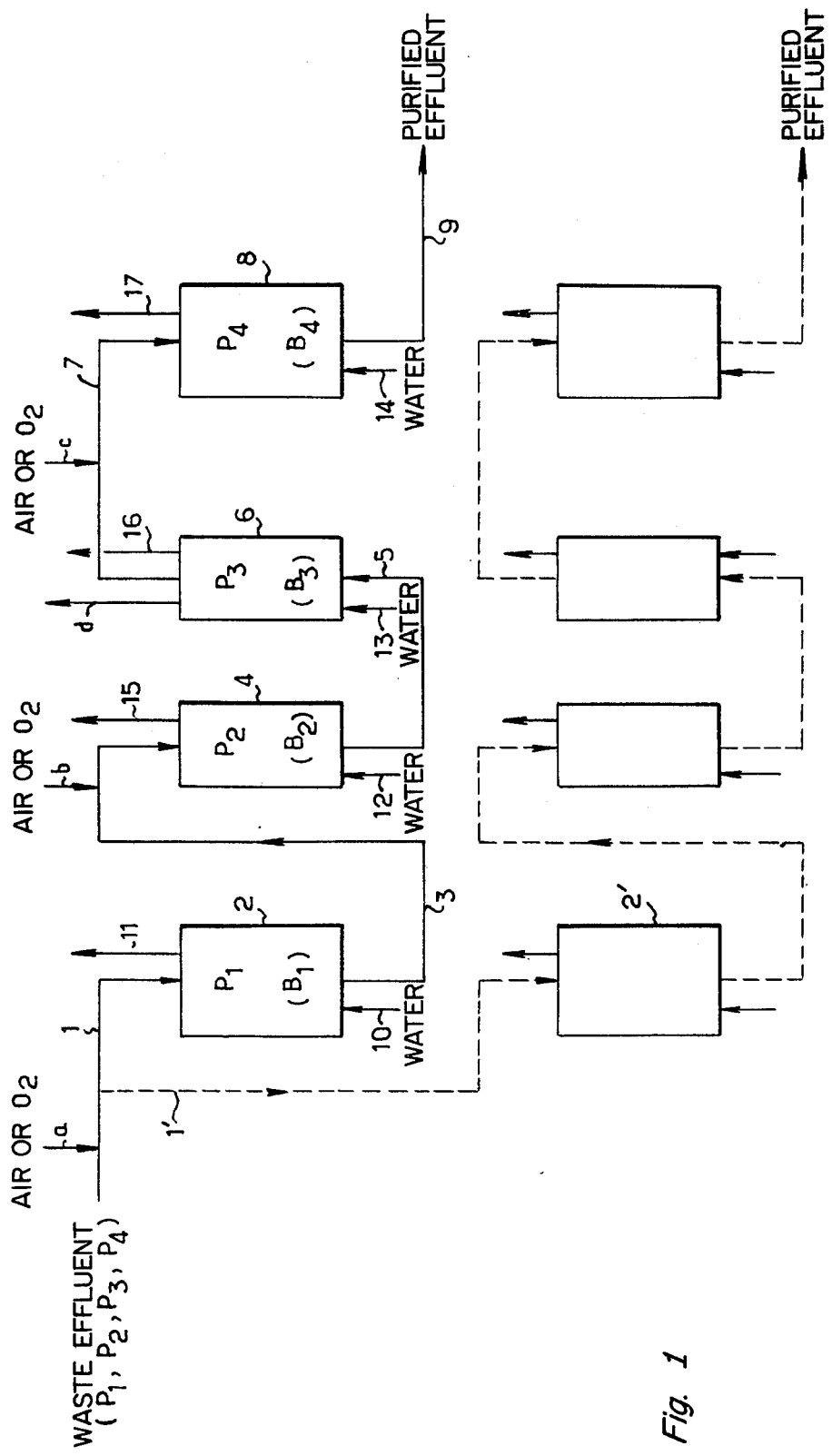

United States Patent [19]

Treyssac

[11] 4,444,664
[45] Apr. 24, 1984

[54] PROCESS FOR THE BIOLOGICAL TREATMENT OF A LIQUID EFFLUENT ON AN ADSORBING MATERIAL BED

[75] Inventor: Georges M. Treyssac, Marcq-en-Baroeul, France

[73] Assignee: Societe Anonyme d'Etudes, de Recherches et de Productions d'Agents Chimiques-E.R.P.A.C., France

[21] Appl. No.: 98,986

[22] Filed: Nov. 30, 1979

[30] Foreign Application Priority Data

Dec. 7, 1978 [FR] France ................................ 73 34490

[51] Int. Cl.$^3$ ............................................. C02F 3/04
[52] U.S. Cl. .................................... 210/605; 210/617; 210/630
[58] Field of Search ............ 210/16, 17, 605, 615–618, 210/630, 903

[56] References Cited

U.S. PATENT DOCUMENTS

| 3,803,029 | 4/1974 | Blecharczyk | 210/16 |
| 3,846,829 | 11/1974 | Jeris et al. | 210/618 X |
| 4,009,099 | 2/1977 | Jeris | 210/618 X |
| 4,053,396 | 10/1977 | Trense et al. | 210/17 |
| 4,076,616 | 2/1978 | Verde | 210/17 |
| 4,126,544 | 11/1978 | Baensch et al. | 210/16 X |

Primary Examiner—Thomas G. Wyse
Attorney, Agent, or Firm—Cesari and McKenna

[57] ABSTRACT

A process for treating a liquid effluent, such as waste water, containing biodegradable organic materials in solution and/or in suspension which consists in causing this effluent to flow over an adsorbing material previously seeded with microbian flora and on which said organic materials spread out depending on their ease of adsorption while thus defining successive layers.

This process is characterized in that the adsorbing material is in the form of as many independent beds as there are layers, these beds being disposed in series.

9 Claims, 1 Drawing Figure

PROCESS FOR THE BIOLOGICAL TREATMENT OF A LIQUID EFFLUENT ON AN ADSORBING MATERIAL BED

The present invention relates to a process for treating a liquid effluent, such as waste water for example, containing biodegradable organic materials in solution and/or in suspension which consists in filtering this effluent on an adsorbent material seeded with microbian flora and on which said organic materials are progressively adsorbed in successive layers.

In the known processes of this type, the polluting organic materials tend to spread progressively over the adsorbent material depending on their ease of adsorption, thus defining superposed zones or layers in number equal to that of said organic materials (a phenomenon similar to the multiple plate distillation separation). The upper zone or layer of the adsorbent material is essentially charged with the most easily adsorbed organic material and the lower zone or layer of this adsorbing material is charged with the least easily adsorbed organic material.

The organic molecules are then fixed on adsorption sites of the adsorbing material depending on their ease of adsorption and are fractionated by the enzymes secreted by the seeded microbian flora. The resulting fractions, less easily adsorbed on the adsorbing material are replaced by new organic material molecules, eluted, then ingested by the microbian flora present in the pores of the adsorbing material and/or in the intergranular spaces thereof.

Thus, there is in each layer development of a microbian florae which tends to become in the long run specific to the degradation of the organic material preponderant in this layer and correlatively smothering of the other microbian flora. There is simultaneously, because of the development of the microbian flora, in each of the layers the production of biological sludges which lead progressively to the clogging up of the adsorbent material. This clogging up occurs preferentially in the first layer.

The result is that it is necessary to wash very frequently all the adsorbing material whereas only a fraction thereof is clogged up. This causes a considerable waste of time.

Furthermore, this washing generally stirs up the adsorbing material and mixes the specific microbian florae which have begun to develop thereon. When the effluent is made to flow on the column, the phenomenon of progressive selection of the specific microbian florae will be reproduced. This starting up again of selection after each washing results in considerable lowering of the capacity and the efficiency of the purification with respect to what they were just before washing or what they could have become if washing had not been necessary. Considered in the aggregate over several degradation-washing cycles, the capacity and the efficiency of the purification are not very high and cannot reach their optimum.

The aim of the present invention is precisely to remedy these disadvantages and to do this, it provides a process which is characterized in that the adsorbing material is in the form of as many independent beds as there are layers, these beds being disposed in series.

Thus, when clogging up by the microbian sludges occurs in any one of the beds of adsorbent material, it is only necessary to wash this single bed which is done in a very short time in relation to known processes, taking into account the small amount of adsorbent material to be washed. Generally, the process of the invention allows the washing frequency to be reduced depending in actual fact on the amounts of biological sludges produced at each plaque.

Moreover, since the washing of the adsorbent material takes place independently layer by layer, there is no longer a mixing of the different microbian flora and so no longer the possibility of their smothering each other and the need to begin again the selection of the specific microbian florae. It will be readily understood that it is thus possible not only to maintain but also to develop progressively and more and more rapidly in each layer the microbian flora specific to the organic material present in this layer. The result is a progressive increase in the capacity of biological degradation in each layer and so a progressive increase in the overall efficiency of the purifying operation. It should be noted that by using the process of the invention, it is possible to treat liquid effluents while giving a value to the organic materials contained in these effluents through the development and so the production of specific microbian florae. A whole range of specific microbian florae may thus be produced from which the microbian flora specific to the degradation of a given organic material may be chosen according to requirements. Furthermore, this range of specific microbian florae will form a reservoir of specific proteins.

According to requirements, all or part of the beds of adsorbent material may be operated in aerobiosis, the beds remaining then operating in anaerobiosis and conversely, all or part of the beds may operate in anaerobiosis in which case the beds remaining will operate in aerobiosis. Of course, before causing the effluent to be treated to flow, the beds intended to operate in aerobiosis are seeded with aerobic microbian flora and the beds intended to operate in anaerobiosis are seeded with anaerobic microbian flora. In fact, in practice it will often be necessary to combine the aerobic process with the anaerobic process for some of the organic materials of the effluent will be more easily degradable aerobically, whereas others will be more easily degradable anaerobically.

In this connection, it should be noted that it will be possible to produce in the beds operating in anaerobiosis methane with high yields, which is an additional way of giving value to the organic materials of the effluent. Advantageously, all or part of the beds operating in anaerobiosis may be each divided into two beds, the first of these two beds being the seat of the acidification process and the second the seat of the methanization process, this separation of the acidification phase and the methane production phase resulting in a considerable speeding up of the biodegradation.

One embodiment of the present invention is described hereafter by way of example, with reference to the accompanying drawing in which FIG. 1 is a simplified diagram of an installation in which the claimed process is implemented.

The effluent to be treated which is in the present case a waste effluent containing in solution and/or in suspension organic materials $P_1$, $P_2$, $P_3$, $P_4$ is brought by duct 1 to the top of a reservoir 2. The effluent leaving the base of this reservoir 2 is then fed by a duct 3 to the top of a reservoir 4, then from the base of this latter through a duct 5 to the base of a reservoir 6 and finally from the top of this latter through a duct 7 to the top of reservoir 8. The purified effluent leaving the base of reservoir 8 is then discharged through a duct 9. Reservoirs 2, 4, 6 and 8 are filled with active carbon on which there is fixed a bacterial flora.

The amounts of active carbon disposed in each of these reservoirs and the adsorbing power thereof are chosen so that the organic materials $P_1$, $P_2$, $P_3$ and $P_4$ spread out progressively in the four reservoirs 2, 4,6 and 8 so that the active carbon of reservoir 2 adsorbs essentially $P_1$, that of reservoir 4 essentially $P_2$, that of reservoir 6 essentially $P_3$ and that of reservoir 8 essentially $P_4$.

According as to whether the polluting organic materials $P_1$, $P_2$, $P_3$ and $P_4$ are more easily degraded in aerobiosis or in anaerobiosis, the operation will be carried out in the presence of air in the reservoirs containing an organic material more easily degradable in an aerobic process and in the absence of air in the reservoirs containing a material more easily degradable in an anaerobic process. In the case of the accompanying FIGURE, where the degradation of $P_1$, $P_2$ and $P_4$ is effected aerobically, air or oxygen inlets a, b, c are provided respectively in ducts 1, 3, 7. Still in the case of the accompanying FIGURE, the degradation of $P_3$ is effected anaerobically and there will thus be formed a methane rich gas discharged at the upper part of the reservoir by means of duct d.

In each of reservoirs 2, 4, 6 and 8 there will then be developed more and more rapidly the bacterial flora specific to the degradation of the organic material which is preponderant therein. Thus, in reservoirs 2, 4, 6 and 8 there will be developed respectively the bacterial florae $B_1$, $B_2$, $B_3$, $B_4$ specific respectively to the degradation of $P_1$, $P_2$, $P_3$, $P_4$.

With the amount of specific bacteria increasing continually, the efficiency of the degradation within each reservoir increases.

After the waste effluent has flowed for a certain time, there will occur clogging up of the active carbon of reservoir 2 by the bacterial sludges created by degradation of $P_1$. It is then necessary to stop the intake of waste effluent and to proceed to the washing of this reservoir 2 by injecting water at the base of reservoir 2 through a duct 10, this water charged with bacterial sludges being discharged at the upper part through a duct 11. Reservoirs 4, 6 and 8 are also provided respectively with washing water inlet ducts 12, 13, 14 and respectively with ducts 15, 16, 17 for discharging water charged with bacterial sludges. Rather than stopping the purification of the effluent, it is preferred for example, and this is what is shown in the drawing, to divert the waste effluent through a duct 1' in order to bring it to the top of the first reservoir 2' belonging to a purification installation identical in all points to that which has just been described. Thus, the waste effluent is fed either to the top of reservoir 2 or to the top of reservoir 2' according as to whether it is necessary to unclog by washing a reservoir of the first installation or of the second installation.

It will be noted that the bacterial flora may be deposited on the active carbon of each reservoir by causing a bacteria rich fluid to flow thereon for a certain length of time, before passing the waste effluent. Preferably, there will be deposited on the active carbon of each reservoir the specific bacterial flora $B_1$, $B_2$, $B_3$ or $B_4$ corresponding to this reservoir, the florae $B_1$, $B_2$, $B_3$ and $B_4$ coming, for example, from another purification installation.

In addition, when in a reservoir there is a considerable production of gas, it is preferable, so that the gas formed does not prevent the even flow of the effluent, to provide a rising stream of this latter in the reservoir, this is what is advised for reservoir 6, as well as a gas-liquid separation unit.

It is also possible in reservoir 6 to separate the acidification phase and the methanization phase. Furthermore, in the installation described above, the bacterial flora has been chosen as microbian flora. It is certain that depending on the nature of $P_1$, $P_2$, $P_3$ and $P_4$, another type of microbian flora such as moulds, yeasts etc. may be chosen.

So as to show the considerable technical process provided by the present invention, the purification performances of the prior art processes and those of the claimed process will be compared hereafter, the treated effluent being effluent coming from dairies or meat canning factories.

Thus, in the conventional treatment by means of activated sludges (aerobic process), the amount of pollution reduction is from 0.3 to 3 kg of BOD5/day/-cub.m. of filtering column and the oxygen consumption is from 1 to 1.2 kg of oxygen per kg of BOD5, whereas in the treatment according to the claimed process, the pollution reduction may reach 50 times that obtained with activated sludges with an average of about 50 to 100 kg of BOD5/day/cub.m of filtering column, the oxygen consumption being divided by 100 (limit of anaerobiosis). Furthermore, the production of sludges is divided by 10 with respect to the usual processes.

Similarly, in the conventional anaerobic treatments, the pollution reduction expressed as BOD5 rarely exceeds 0.3 kg/day/cub.m. of filtering column, whereas by using the process of the invention, it is possible to reach pollution reductions of the order of 50 kg of BOD5/day/cub.m. of filtering column. Moreover, the operating times which range from 4 to 30 days in the known processes, are reduced to scarcely a few hours. The production of methane is at least equivalent to what it is in the conventional processes and it is possible to lower the treatment temperature by at least 10° C.

I claim:

1. A process for treating a liquid effluent containing biodegradable organic materials in solution and/or in suspension which consists in causing this effluent to flow over an adsorbing material previously seeded with microbian flora and on which said organic materials spread out depending on their ease of adsorption while thus defining successive layers characterized in that the adsorbing material is in the form of as many independent beds as there are layers, these beds being disposed in series.

2. A process according to claim 1, characterized in that when one of the beds is clogged up by the microbian sludges produced during the degradation this bed is washed independently of the others.

3. A process according to claim 1 or 2, characterized in that all or part of the beds operates in aerobiosis, the beds remaining then operating in anaerobiosis and conversely, in that all or part of the beds operates in anaerobiosis in which case the beds remaining operate in aerobiosis.

4. A process according to claim 1 or 2, characterized in that each bed is previously seeded with microbian flora specific to the adsorbed organic material, the beds operating in aerobiosis being seeded with microbian flora of the aerobic type and the beds operating in anaerobiosis being seeded with microbian flora of the anaerobic type.

5. A process according to claim 1 or 2, characterized in that the adsorbing material is active carbon.

6. A process according to claim 3, characterized in that each bed is previously seeded with microbian flora specific to the adsorbed organic material, the beds operating in aerobiosis being seeded with microbian flora of the aerobic type and the beds operating in anaerobiosis being seeded with microbian flora of the anaerobic type.

7. A process according to claim 3, characterized in that the adsorbing material is active carbon.

8. A process according to claim 4, characterized in that the adsorbing material is active carbon.

9. In a process for treating a liquid effluent containing biodegradable organic materials in solution and/or suspension wherein the effluent is flowed over an adsorbing material previously seeded with microbian flora and on which the organic materials spread out depending on their ease of adsorption while thus defining successive layers, the improvement comprising the steps of flowing the effluent through a series-connected plurality of independent microbian flora-seeded beds of adsorbing material, and selecting the number of beds in the series and the amount and adsorbing power of the material in each bed so that the successive layers accumulate in successive beds in said series whereby in time the microbian flora in each bed is specific to the degradation of the organic materials comprising the layer in that bed.

\* \* \* \* \*